(12) United States Patent
Chen et al.

(10) Patent No.: US 10,873,640 B2
(45) Date of Patent: Dec. 22, 2020

(54) INFORMATION EXCHANGE METHOD AND SERVER

(71) Applicant: TENCENT TECHNOLOGY (SHENZHEN) COMPANY LIMITED, Shenzhen (CN)

(72) Inventors: Hao Chen, Shenzhen (CN); Maowei Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 453 days.

(21) Appl. No.: 15/433,059

(22) Filed: Feb. 15, 2017

(65) Prior Publication Data

US 2017/0163749 A1   Jun. 8, 2017

Related U.S. Application Data

(63) Continuation of application No. PCT/CN2016/072142, filed on Jan. 26, 2016.

(30) Foreign Application Priority Data

Feb. 13, 2015   (CN) .......................... 2015 1 0079117

(51) Int. Cl.
*H04L 29/08*   (2006.01)
*H04L 12/58*   (2006.01)
(Continued)

(52) U.S. Cl.
CPC .......... *H04L 67/20* (2013.01); *H04L 12/4625* (2013.01); *H04L 51/00* (2013.01);
(Continued)

(58) Field of Classification Search
CPC ..... H04L 67/20; H04L 12/4625; H04L 51/00; H04L 65/1063; H04L 67/32; H04L 51/18; H04L 61/15; H04L 41/5061
See application file for complete search history.

(56) References Cited

U.S. PATENT DOCUMENTS

| 6,938,022 B1 * | 8/2005 | Singhal ............... G06F 21/6254 705/74 |
| 9,001,977 B1 * | 4/2015 | Ramalingam ......... H04M 3/385 379/142.05 |

(Continued)

FOREIGN PATENT DOCUMENTS

| CN | 1633127 A | 6/2005 |
| CN | 1744582 A | 3/2006 |

(Continued)

OTHER PUBLICATIONS

The World Intellectual Property Organization (WIPO) International Search Report for PCT/CN2016/072142 dated Apr. 8, 2016 6 Pages.

(Continued)

*Primary Examiner* — Kevin T Bates
*Assistant Examiner* — Lesa M Kennedy
(74) *Attorney, Agent, or Firm* — Anova Law Group, PLLC

(57) ABSTRACT

The present disclosure relates to the field of Internet technologies, and discloses an information exchange method and a server. The method includes: receiving a request message sent by a terminal; sending the request message to a third-party server that corresponds to a public identifier, so that the third-party server receives the request message, obtains response information according to request information in the request message, and returns the public identifier, an Internet application identifier, and the response information; receiving the public identifier, the Internet application identifier, and the response information that are returned by the third- (Continued)

party server, and sending the public identifier and the response information to the terminal that corresponds to the Internet application identifier.

18 Claims, 7 Drawing Sheets

(51) Int. Cl.
*H04L 12/46* (2006.01)
*H04L 29/06* (2006.01)
(52) U.S. Cl.
CPC .......... *H04L 65/1063* (2013.01); *H04L 67/32* (2013.01); *H04L 51/18* (2013.01)

(56) References Cited

U.S. PATENT DOCUMENTS

| | | | |
|---|---|---|---|
| 2008/0070593 A1* | 3/2008 | Altman | H04W 4/029 455/457 |
| 2008/0118052 A1* | 5/2008 | Houmaidi | H04M 3/5232 379/265.11 |
| 2009/0016522 A1* | 1/2009 | Torres | H04M 3/42221 379/265.06 |
| 2009/0070412 A1* | 3/2009 | D'Angelo | G06Q 10/10 709/203 |
| 2011/0051920 A1* | 3/2011 | Dashe | G06Q 10/10 379/265.09 |
| 2013/0007122 A1 | 1/2013 | Su | |
| 2013/0290203 A1* | 10/2013 | Purves | G06Q 50/01 705/319 |
| 2014/0038549 A1* | 2/2014 | Lehane | H04W 24/02 455/406 |
| 2015/0256415 A1* | 9/2015 | Williamson | H04L 67/02 709/223 |

FOREIGN PATENT DOCUMENTS

| | | |
|---|---|---|
| CN | 101374153 A | 2/2009 |
| CN | 103428076 A | 12/2013 |
| CN | 103561115 A | 2/2014 |
| CN | 104038514 A | 9/2014 |
| CN | 104123686 A | 10/2014 |
| CN | 104144420 A | 11/2014 |
| CN | 104253784 A | 12/2014 |
| CN | 104717131 A | 6/2015 |
| WO | 2014176805 A1 | 11/2014 |

OTHER PUBLICATIONS

State Intellectual Property Office of the P.R. (SIPO) Office Action 1 for 201510079117.8 dated Sep. 7, 2016 10 Pages.
The State Intellectual Property Office of the People's Republic of China (SIPO) Office Action 2 for 201510079117.8 dated Dec. 19, 2016 10 pages (including translation).

\* cited by examiner

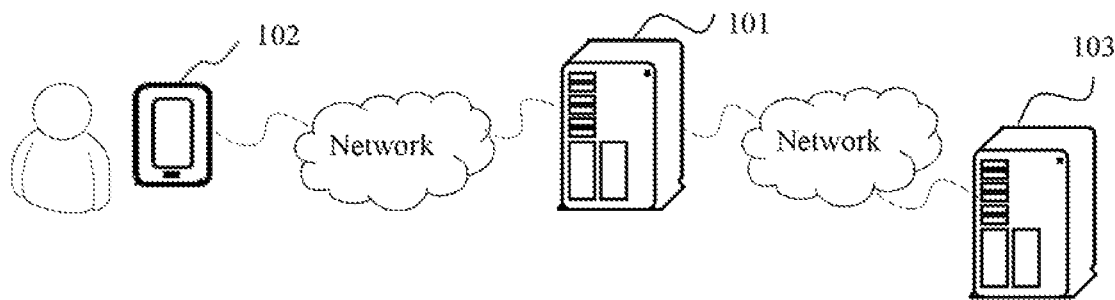

FIG. 1

```
Receive a request message sent by a terminal, the request message carrying at
least request information, a public identifier, and an Internet application
identifier that is used by the terminal                                          ─── 201

▼
Send the request message to a third-party server that corresponds to the public
identifier, so that the third-party server receives the request message, obtains
response information according to the request information in the request
message, and returns the public identifier, the Internet application identifier,  ─── 202
and the response information, the response information being at least one of
text information, picture information, audio information, and video
information ▼
Receive the public identifier, the Internet application identifier, and the
response information that are returned by the third-party server, and send the   ─── 203
public identifier and the response information to the terminal that corresponds
to the Internet application identifier
```

FIG. 2

```
Receive a request message sent by an Internet application server, the request
message carrying at least request information, a public identifier, and an       ─── 301
Internet application identifier that is used by a terminal that sends the request
message ▼
Obtain response information according to the request information in the
request message, and return the public identifier, the Internet application
identifier, and the response information to the Internet application server, so
that the Internet application server sends the response information and the     ─── 302
public identifier to the terminal that corresponds to the Internet application
identifier, the response information being at least one of text information,
picture information, audio information, and video information
```

FIG. 3

INFORMATION EXCHANGE METHOD AND SERVER

RELATED APPLICATION

This application claims priority to PCT/CN2016/072142 filed on Jan. 26, 2016, which claims Chinese Patent Application No. 201510079117.8, filed with the Chinese Patent Office on Feb. 13, 2015 and entitled "INFORMATION EXCHANGE METHOD AND SERVER," which are incorporated herein by reference in their entirety.

FIELD OF THE TECHNOLOGY

The present disclosure relates to the field of network technologies, and in particular, to au information exchange method and a server.

BACKGROUND OF THE DISCLOSURE

With the rapid development of science and technologies, when using a client application on a terminal, a user often needs to obtain information by using the client. For example, if the client is a news client, the user may obtain the latest news or the latest service information by using the news client. As information is usually sent to a terminal by an Internet application server that corresponds to an application program, how the Internet application server and the terminal exchange information is a key to improvement of user experience.

A related technology provides an information exchange method, including: when an Internet application server generates new information, pushing the generated information to a terminal. The generated information is text information. However, the Internet application server often uni-directionally pushes information to the terminal, but the pushed information may not be information requested by a user. Moreover, when multiple pieces of info cation are pushed to the terminal in a short time, inconvenience may further caused to the user. Therefore, the existing information exchange method is inflexible, resulting in a poor effect.

SUMMARY

To resolve the problem of the related technology, embodiments of the present disclosure provide an information exchange method and a server. The technical solutions are as follows:

According to a first aspect, an information exchange method is provided, the method being used for an Internet application server, and being applied to a scenario in which a third-party server and a terminal exchange information by using the Internet application server, the terminal exchanging information with the Internet application server by using a corresponding Internet application identifier, the third-party server exchanging information with the Internet application server by using a public identifier, the public identifier and the Internet application identifier being identifiers registered with the Internet application server, and the method including receiving a request message sent by the terminal, the request message carrying at least request information, the public identifier, and the Internet application identifier that is used by the terminal; sending the request message to the third-party server that corresponds to the public identifier, so that the third-party server receives the request message, obtains response information according to the request information in the request message, and returns the public identifier, the Internet application identifier, and the response information, the response information being at least one of text information, picture information, audio information, and video information; and receiving the public identifier, the Internet application identifier, and the response information that are returned by the third-party server, and sending the public identifier and the response information to the terminal that corresponds to the Internet application identifier.

According to a second aspect, an information exchange method is provided, the method being used for a third-party server, and being applied to a scenario in which the third-party server and a terminal exchange information by using an Internet application server, the terminal exchanging information with the Internet application server by using a corresponding Internet application identifier, the third-party server exchanging information with the Internet application server by using a public identifier, the public identifier and the Internet application identifier being identifiers registered with the Internet application server, and the method including: receiving a request message sent by the Internet application server, the request message carrying at least request information, the public identifier, and the Internet application identifier that is used by the terminal that, sends the request message; obtaining response information according to the request information in the request message, and returning the public identifier, the Internet application identifier, and the response information to the Internet application server, so that the Internet application server sends the response information and the public identifier to the terminal that corresponds to the Internet application identifier, the response information being at least one of text information, picture information, audio information, and video information.

According to a third aspect, an Internet application server is provided, the server including: a first receiving module, configured to receive a request message sent by a terminal, the request message carrying at least request information, a public identifier, and an Internet application identifier that is used by the terminal; a first sending module, configured to send the request message to a third-party server that corresponds to the public identifier, so that the third-party server receives the request message, obtains response information according to the request information in the request message, and returns the public identifier, the Internet application identifier, and the response information, the response information being at least one of text information, picture information, audio information, and video information; a second receiving module, configured to receive the public identifier, the Internet application identifier, and the response information that are returned by the third-party server; and a second sending module, configured to send the public identifier and the response information to the terminal that corresponds to the Internet application identifier.

According to a fourth aspect, a third-party server is provided, the server including: a receiving module, configured to receive a request message sent by an Internet application server, the request message carrying at least request information, a public identifier, and an Internet application identifier that is used by a terminal that sends the request message; a first obtaining module, configured to obtain response information according to the request information in the request message; and a return module, configured to return the public identifier, the Internet application identifier, and the response information to the Internet application server, so that the Internet application server sends the response information and the public identifier to the terminal that corresponds to the Internet application identifier, the response information being at least one of text information, picture information, audio information, and video information.

According to a fifth aspect, an Internet application server is provided, the server including; one or more processors; and a memory; the memory storing one or more programs, the one or more programs being configured to be performed by the one or more processors, and the one or more programs including instructions used to perform the following operations: receiving a request message sent by a terminal, the request message carrying at least request information, a public identifier, and an Internet application identifier that is used by the terminal; sending the request message to a third-party server that corresponds to the public identifier, so that the third-party server receives the request message, obtains response information according to the request information in the request message, and returns the public identifier, the Internet application identifier, and the response information, the response information being at least one of text information, picture information, audio information, and video information; and receiving the public identifier, the Internet application identifier, and the response information that are returned by the third-party server, and sending the public identifier and the response information to the terminal that corresponds to the Internet application identifier.

According to a sixth aspect, a third-party server is provided, the server including: one or more processors; and a memory; the memory storing one or more programs, the one or more programs being configured to be performed by the one or more processors, and the one or more programs including instructions used to perform the following operations: receiving a request message sent by an Internet application server, the request message carrying at least request information, a public identifier, and an Internet application identifier that is used by a terminal that sends the request message, and obtaining response information according to the request information in the request message, and returning the public identifier, the Internet application identifier, and the response information to the Internet application server, so that the Internet application server sends the response information and the public identifier to the terminal that corresponds to the Internet application identifier, the response information being at least one of text information, picture information, audio information, and video information.

The technical solutions provided in the embodiments of the present disclosure have the following beneficial effects. An Internet application server receives a request message sent by a terminal, sends the request message to a third-party server, and receives a public identifier, an Internet application identifier, and response information that are returned by the third-party server according to the request message; subsequently, the Internet application server sends the received public identifier and response information to the terminal that corresponds to the Internet application identifier, so that by means of interaction between the third-party server and the terminal and the Internet application server, information reply based on an Internet application is implemented, and information exchange is highly flexible and an effect is desirable while a user requirement is satisfied.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following descriptions show merely some embodiments of the present disclosure, and a person of ordinary skill in the an may still derive other drawings from the accompanying drawings without creative efforts.

FIG. 1 is a schematic diagram of an implementation environment involved in an information exchange method according to an embodiment of the present disclosure;

FIG. 2 is a flowchart of an information exchange method according to another embodiment of the present disclosure;

FIG. 3 is a flowchart of an information exchange method according to another embodiment of the present disclosure;

DESCRIPTION OF EMBODIMENTS

Figure 4:
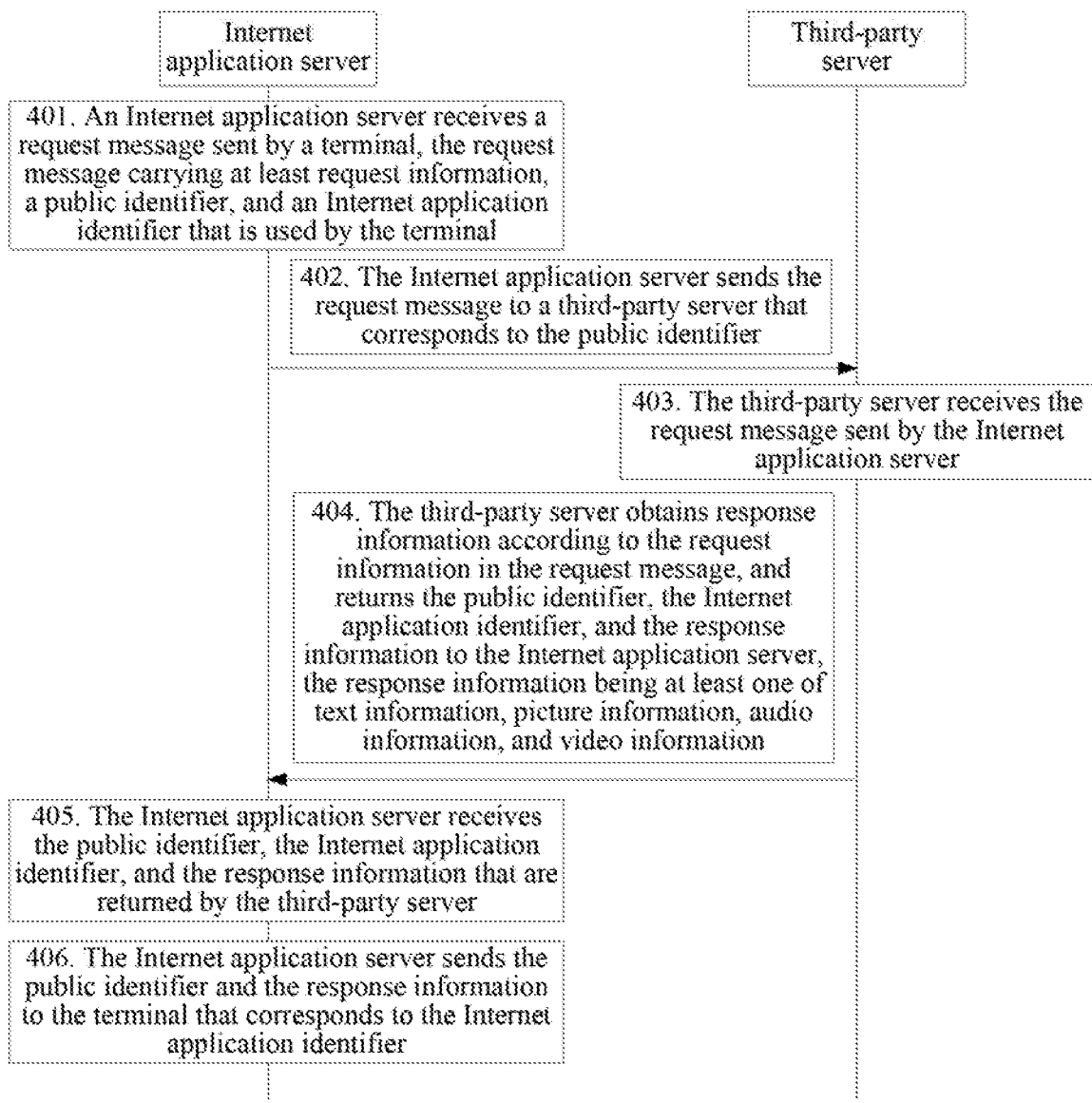
FIG. 4 is a flowchart of an information exchange method according to another embodiment of the present disclosure.

To make the objectives, technical solutions, and advantages of the present disclosure clearer, the following further describes the implementation manners of the present disclosure in detail with reference to the accompanying drawings.

FIG. 1 is a schematic diagram of an implementation environment involved in an information exchange method according to an embodiment of the present disclosure. As shown in FIG. 1, the implementation environment includes an Internet application server 101, a terminal 102, and a third-party server 103. The Internet application server 101 is connected to the terminal 102 and the Internet application server 101 is connected to the third-party server 103 both by using a network. The network may be a wired network, or may be a wireless network.

The Internet application server 101 may be configured as a server that provides a service by using the Internet. The Internet application server 101 may be art instant messaging server, a social application server, or a server that can implement service such as payment by using the Internet. A specific type of the Internet application server 101 is not limited in this embodiment of the present disclosure.

The terminal 102 may be a smartphone, a tablet computer, a portable computer, a desktop computer, or the like. A client of an Internet application runs in the terminal 102. The Internet application may be an application such as an instant messaging application, a social application, a group voice tool, a microblog application, a shopping application, or a payment application. A user generally registers a user account with the Internet application, and obtains, by using the user account, various functions provided by the Internet application. For example, the Internet application is an instant messaging application. A user may perform, in the instant messaging application by using a user account, various operations such as pushing information to another user, receiving information pushed by another user, and setting user information. The terminal 102 may send a request message to the third-party server 103. The request message may include a public identifier to which attention has been paid. The public identifier corresponds to the third-party server 103. The public identifier is an account number applied for by a developer or a merchant on an Internet application server 101. The developer or the merchant may implement, on the Internet application server 101 by using the public identifier and based on a manner such as text, picture, voice, or video, comprehensive information pushing to another user account using the Internet application, or communication or interaction with a user of another user account.

The third-party server 103 may be a platform providing a product or a service, or may be configured as a server. The third-party server 103 may establish a cooperation relationship with the Internet application server 101 in advance, so as to promote the product or service of the third-party server 103 by using the Internet application server 101. "The third party" is relative to the "terminal" and the Internet application server, and belongs to a server different from the in met application server 101. However, it does not mean that the third party needs to belong to an owner different from an owner of the Internet application server 101. For example, "the third-party server 103" and the Internet application server 101 may belong to a same owner A, or one of them belongs to an owner A, the other belongs to another owner B, and the owner A and the owner B may be associated, or may be independent from each other.

In addition, this embodiment of the present disclosure, in an actual application, the Internet application server 101 may be one server, or may be a server cluster that includes multiple servers, or may be a cloud computing service center. Similarly, the third-party server 103 may be one server, or may be a server cluster that includes multiple servers, or may be a cloud computing center. Certainly, there may be another possible implementation forms.

The method provided in this embodiment of the present disclosure is applied to a scenario in which the terminal 102 and the third-party server 103 exchange information based on the Internet application server 101. For details of a specific information exchange method, refer to the following embodiments:

In the related technology, during information exchange, an Internet application server uni-directionally pushes newly generated text information to a terminal, and the text information may not be information required by a user. Moreover, when multiple pieces of text information are pushed to the terminal in a short time, inconvenience is further caused to the user. Therefore, the information exchange in the solution is inflexible, resulting in a poor effect.

To prevent the foregoing case from occurring, and to improve flexibility during information exchange, with reference to the foregoing implementation environment shown in FIG. 1, an embodiment of the present disclosure provides an information exchange method. The method is used for an Internet application server, and is applied to a scenario in which a third-party server and a terminal exchange information by using the Internet application server. The terminal exchanges information with the Internet application server by using an Internet application identifier. The third-parry server exchanges information with the Internet application server by using a public identifier. The public identifier and the Internet application identifier are identifiers registered with the Internet application server. Referring to FIG. 2, the method provided in this embodiment includes the following procedure:

201. Receive a request message sent by a terminal, the request message carrying at least request information, a public identifier, and an Internet application identifier that is used by the terminal.

202. Send the request message to a third-party server that corresponds to the public identifier, so that the third-party server receives the request message, obtains response information according to the request information in the request message, and returns the public identifier, the Internet application identifier, and the response information, the response information being at least one of text information, picture information, audio information, and video information.

203. Receive the public identifier, the Internet application identifier, and the response information that are returned by the third-party server, and send the public identifier and the response information to the terminal that corresponds to the Internet application identifier.

According to the method provided in this embodiment of the present disclosure, an Internet application server receives a request message sent by a terminal, sends the request message to a third-party server, and receives a public identifier, an Internet application identifier, and response information that are returned by the third-party server according to the request message; subsequently, the Internet application server sends the received public identifier and response information to the terminal that corresponds to the Internet application identifier, so that by means of interaction between the third-party server and the terminal and the Internet application server, information reply based on an Internet application is implemented, and information exchange is highly flexible and an effect is desirable while a user requirement is satisfied.

In an optional embodiment, the Internet application server stores information that corresponds to all customer service identifiers subordinate to the public identifier, and the method further includes: receiving a customer service identifier processing request sent by the third-party server, where the customer service identifier processing request includes at least one customer service identifier and corresponding setting information; and modifying, according to the customer service identifier processing request, stored information that corresponds to the customer service identifier.

In another optional embodiment, the method further includes: receiving an operation request sent by the third-party server, where the operation request includes at least one of: an addition request for adding a customer service identifier, a modification request for modifying a customer service identifier, a deletion request for deleting a customer service identifier, and an obtaining request for obtaining information that corresponds to a customer service identifier; and performing a corresponding operation on the customer service identifier according to the operation request.

Any combination of the foregoing optional technical solutions can be used to form an optional embodiment of the present disclosure, which is not further described herein.

With reference to the implementation environment shown in FIG. 1, an embodiment of the present disclosure provides an information change method. The method is used for a third-party server, and is applied to a scenario in which the third-party server and a terminal exchange information by using an Internet application server. The terminal exchanges information with the Internet application server by using a corresponding Internet application identifier. The third-party server exchanges information with the Internet application server by using a public identifier. The public identifier and the Internet application identifier are identifiers registered with the Internet application server. Referring to FIG. 3, the method provided in this embodiment includes the following procedure:

301. Receive a request message sent by an Internet application server, the request message carrying at least request information, a public identifier, and an Internet application identifier that is used by ends the request message.

302. Obtain response in n according to the request information the request message, and return the public identifier, the Internet application identifier, and the response information to the Internet application server, so that the Internet application server sends the response information and the public identifier to the terminal that corresponds to the Internet application identifier, the response information being at least one of text information, picture information, audio information, and video information.

According to the method provided in this embodiment of the present disclosure, a third-party server receives request message sent by an Internet application server, obtains response information according to the request message, add returns a public identifier, an Internet application identifier and the response information to the Internet application server, so that the Internet application server sends the response information and the public identifier to a terminal that corresponds to the Internet application identifier, and by means of interaction between the third-party server and the terminal and the Internet application server, information reply based on an Internet application is implemented, and information exchange highly flexible and an effect is desirable while a user requirement is satisfied.

In an optional embodiment, the obtaining response information according to the request information in the request message includes: display an information reply interface according to the request information in the request message; and obtaining the response information in the information reply interface; and the turning the public identifier, the Internet application identifier.

The response information to the Internet application server includes: sending the response information, the public identifier, and the Internet application identifier to the Internet application server according to an information sending instruction if the information sending instruction is detected in the information reply interface.

In an optional embodiment, the obtaining response information according to the request information in the request message includes: obtaining, according to a predefined interface, the response, information that corresponds to the request information in the request message. The returning the public identifier, the Internet application identifier, and the response information to the Internet application server includes: sending the response information, the public identifier, and the Internet application identifier to the Internet application server by using the predefined interface.

In an optional embodiment, there is at least one customer service identifier subordinate to the public identifier, and the sending the response information, the public identifier, and the Internet application identifier to the Internet application server by using the predefined interface includes: determining a customer service identifier subordinate to the public identifier and used for sending information; and sending the response information, the public identifier, and the Internet application identifier to the Internet application server by using the predefined interface and according to the determined customer service identifier.

In an optional embodiment, the Internet application server stores information that corresponds to all customer service identifiers subordinate to the public identifier, and the method further includes: obtaining a customer service identifier processing, request, where the customer service identifier processing request includes at least one customer service identifier and corresponding setting information; and sending the customer service identifier processing request to the Internet application server, so that the Internet application server modifies, according to the customer service identifier processing request, stored information that corresponds to the customer service identifier.

In an optional embodiment, the method further includes: obtaining an operation request, where the operation request includes at least one of: an addition request for adding a customer service identifier, a modification request for modifying a customer service identifier, a deletion request for deleting a customer service identifier, and an obtaining request for obtaining information that corresponds to a customer service identifier; and sending the operation request to the Internet application server.

Any combination of the foregoing optional technical solutions can be used to form an optional embodiment of the present disclosure, which is not further described herein.

With reference to the foregoing implementation environment shown in FIG. 1, an embodiment of the present disclosure provides an information exchange method. The method involves a third-party server, an Internet application server, and a terminal, and is applied to a scenario in which the third-party server and a terminal exchange information by using an Internet application server. The terminal exchanges information with the Internet application server by using an Internet application identifier. The third-party server exchanges information with the Internet application server by using a public identifier. The public identifier and the Internet application identifier are identifiers registered with the Internet application server. Referring to FIG. 4, the method provided in this embodiment includes the following procedure:

401. An Internet application server receives a request message sent by a terminal, the request message carrying at least request information, a public identifier, and an Internet application identifier that is used by the terminal.

After the terminal sends a request message to an Internet application server, the Internet server may correspondingly receive the request message.

A sending manner in which the terminal sends the request message to the Internet application server is not specifically limited in this embodiment. In an actual implementation, this step includes but is not limited to: obtaining a public identifier selected by a user; displaying an information input box according to the public identifier selected by the user; and sending a request message to the Internet application server according to request information input by the user into the information input box, the public identifier selected by the user, and an Internet application identifier used by the user, when an instruction for sending a request message is detected. The request information may include information input by the user into the information input box. In one embodiment, the request information may be an inquiry for a product, or for a type of product. In another embodiment, the request information may be a piece of data generated based on the Internet browsing history of the user. For example, if the user browsed or searched for certain products or subject matter, the request information may include identification of the subject matter or product.

Because the public identifier is registered with the Internet application server, when multiple public identifiers are registered, there are accordingly multiple public identifiers generated on the Internet application server. Moreover, when the user uses an Internet application by using the Internet application identifier, at least one public identifier may be added, and each public identifier corresponds to one third-party server. Therefore, to determine a public identifier that corresponds to a third-party server to which the user needs to send a request message, in this step, the public identifier selected by the user needs to be obtained, and the public identifier is added to the request message, so that subsequently the Internet application server sends the request message to a third-party server that corresponds to the public identifier.

402. The Internet application server sends the request message to a third-party server that corresponds to the public identifier.

It can be learned from the foregoing step 401 that the public identifier corresponds to the third-party server. Therefore, the Internet application server may send, according to the public identifier in the request message, the request message to the third-party server that corresponds to the public identifier. A manner in which the Internet application server sends the request message to the third-party server according to the public identifier in the request message is not specifically limited in this embodiment. In an actual implementation, this step includes but is not limited to: pre-storing a mapping table between each public identifier and an Internet Protocol (IP) address of a third-party server; querying the mapping table for an IP that corresponds to the public identifier in the request message; and sending the request message to a corresponding third-party server according to the found IP.

The Internet application server may send the request message to the third-party server by using a Hypertext Transfer Protocol (HTTP) POST request. The POST request may carry the request message. In addition, subsequently all information may be sent by using an HTTP POST request. This is not specifically limited in this embodiment. Correspondingly, when information is received, a POST request may be received according to the HTTP.

403. The third-party server receives the request message sent by the Internet application server.

A manner in which the third-party server receives a request message sent by the Internet application server is not specifically limited in this embodiment, and includes but is not limited to receiving a request message that is sent by the Internet application server in a form of a POST request.

404. The third-party server obtains response information according to the request information in the request message, and returns the public identifier, the Internet application identifier, and the response information to the Internet application server, the response information being at least one of text information, picture information, audio information, and video information.

A manner in which the third-party server obtains response information according to the request information in the request message is not specifically limited in this embodiment, and includes but is not limited to the following two obtaining manners:

A first obtaining manner is: displaying an information reply interface according to the request information in the request message; and obtaining the response information in the information reply interface.

Correspondingly, when the public identifier, the Internet application identifier, and the response information are returned to the Internet application server, the following may be included: sending the response information, the public identifier, and the Internet application identifier to the Internet application server according to an information sending instruction if the information sending instruction is detected in the information reply interface.

In this manner, response information is mainly input in the information reply interface, so as to return the response information to the Internet application server. When the response information is input in the information reply interface, relatively simple text information may be input, or relatively complex picture and text, audio, or video information may be input. For the foregoing possible requirement, two reply options may be set in an operation interface, where a first replay option is a quick reply option, and a second reply option is a normal reply option. This is not specifically limited in this embodiment. By means of the quick reply option, text information can be quickly input. By means of the normal reply option, information such as pictures and text, audio, and videos can be made or selected according to a requirement. As the quick reply option and the normal reply option provide different functions, when it is detected that the two options are clicked, different information reply interfaces may be displayed. This is not specifically limited in this embodiment. For example, when it is detected that the quick reply option is clicked, the information reply interface may be shown in FIG. 5. When it is detected that the normal reply option is clicked, the information reply interface may be shown in FIG. 6.

A second obtaining manner is: obtaining, according to a predefined interface, the response information that corresponds to the request information in the request message.

Correspondingly, when the public identifier, the Internet application identifier, and the response information are returned to the Internet application server, the following may be included: sending the response information, the public identifier, and the Internet application identifier to the Internet application server by using the predefined interface.

The predefined interface is generally a predefined application programming interface (API) function. Therefore, the request message may be used as a parameter and transmitted to the predefined interface, so as to obtain, by using the predefined interface, the response information that corresponds to the request message. This is not specifically limited in this embodiment.

In addition, because the predefined interface stay include an information sending instruction, the response information, the public identifier, and the Internet application identifier may be sent to the Internet application server according to the information sending instruction. This is also not specifically limited in this embodiment.

For example, the third-party server returns a public identifier, an Internet application identifier, and response information to the Internet application server in a format of a JSON data packet. Response information corresponding to different types of information may be shown as follows:

(1) Text Information:

```
{
  "touser":"OPENID",
  "msgtype":"text",
  "text":
  {
    "content":"Hello World"
  }
}
``` where looser is a common user identifier, msgtype is an information type, text is a text type, and text content is "Hello World".

(2) Picture Information:

```
{
   "touser":"OPENID",
   "msgtype":"image",
   "image":
   {
      "media_id":"MEDIA_ID"
   }
}
``` where an information type is an image type.

(3) Voice Information:

```
{
   "touser":"OPENID",
   "msgtype":"voice",
   "voice":
   {
      "media_id":"MEDIA_ID"
   }
}
```

(4) Video Information:

```
{
   "touser":"OPENID",
   "msgtype":"video",
   "video":
   {
      "media_id":"MEDIA_ID",
      "thumb_media_id":"MEDIA_ID",
      "title":"TIILE",
      "description":"DESCRIPTION"
   }
}
``` where an information type is a video type, and a video name is TITLE.

(5) Audio Information:

```
{
   "touser":"OPENID",
   "msgtype":"music",
   "music":
   {
      "title":"MUSIC_TITLE",
      "description":"MUSIC_DESCRIPTION",
      "musicurl":"MUSIC_URL",
      "hqmusicurl":"HQ_MUSIC_URL",
      "thumb_media_id":"THUMB_MEDIA_ID"
   }
}
``` where an information type is a music type, description is an audio description, musicurl is an audio link, hqmusicurl is a high-quality audio link.

(6) Picture and Text Information:

```
{
   "touser":"OPENID",
   "msgtype":"news",
   "news": {
      "articles": [
      {
         "title":"Happy Day",
         "desctiption":"Is Really A Happy Day",
         "url":"URL",
         "picurl":"PIC_URL"
      },
      {
         "title":"Happy Day",
         "description":"Is Really A Happy Day",
         "url":"URL",
         "picurl":"PIC_URL"
      }
      ]
   }
}
``` where when the foregoing information is sere, load of the Internet application server is increased. Therefore, a quantity of information to be sent may be limited, to avoid extremely heavy load on the server. This is not specifically limited in this embodiment.

It should be noted that, because the third-party server generally needs to process multiple request messages, to average load for processing information, multiple subordinate customer service identifiers may be set for the public identifier that corresponds to the third-party server, and multiple customer service persons simultaneously process the request messages by using the customer service identifiers. This is not specifically limited in this embodiment. Correspondingly, the sending the response information, the public identifier, and the Internet application identifier to the Internet application server according to an information sending instruction if the information sending instruction is detected in the information reply interface includes: determining a customer service identifier subordinate to the public identifier and used for sending information; and sending the response information, the public identifier, and the Internet application identifier to the Internet application server according to the determined customer service identifier and the information sending instruction. Similarly, the sending the response information, the public identifier, and the Internet application identifier to the Internet application server by using the predefined interface includes: determining a customer service identifier subordinate to the public identifier and used for sending information; and sending the response information the public identifier, and the Internet application identifier to the Internet application server by using the predefined interface and according to the determined customer service identifier.

When the third-party server sends response information to the Internet application server by using a customer service identifier, the third-party server may add a parameter customservice to the information to be sent, to identify that the response information is sent by using, the customer service identifier. For example, if the response information is text information, content of the response information may be:

```
{
   "touser":"OPENID",
   "msgtype":"text",
   "text":
   {
      "content":"Hello World"
   },
   "customservice":
   {
      "kfaccount": "test1@kftest"
   }
}
```

A manner of determining a customer service identifier subordinate to the public identifier and used for sending information is not specifically limited in this embodiment, and includes but is not limited to: selecting, according to a quantity of request messages currently to be processed by each customer service identifier, a customer service identifier from all customer service identifiers that has a smallest quantity of request messages currently to be processed. By means of the foregoing manner, load for processing information can be averaged as much as possible, and the request messages can be processed as quickly as possible.

405. The Internet application server receives the public identifier, the Internet application identifier, and the response information that are returned by the third-party server.

A manner in which the Internet application server receives the public identifier, the Internet application identifier, and the response information that are returned by the third-party server is not specifically limited in this embodiment, and includes but is not limited to: receiving, by using a predefined interface corresponding to the third-party server, the public identifier, the Internet application identifier, and the response information that are returned by the third-party server.

It should be noted that, in the foregoing step 404, the third-party server may send the response information, the public identifier, and the Internet application identifier to the Internet application server by using the predefined interface and according to the determined customer service identifier. Therefore, when the Internet application server receives the public identifier, the Internet application identifier, and the response information that are returned by the third-party server, a customer service identifier may further be included. This is not specifically limited in this embodiment.

406. The Internet application server sends the public identifier and the response information to the terminal that corresponds to the Internet application identifier.

When the Internet application server intends to send information, the Internet application server needs to determine a terminal to which the information is to be sent. Therefore, when the Internet application server intends to send information, the Internet application server may send, according to the Internet application identifier, the response information to the terminal that corresponds to the Internet application identifier. After the Internet application server sends the public identifier and the response information to the terminal that corresponds to the Internet application identifier, on a side of the terminal, the response information may be displayed in a display interface that corresponds to the public identifier, and the user, is prompted to check the response information. This is not specifically limited in this embodiment.

In addition, in the foregoing step 405, when the Internet application server receives the public identifier, the Internet application identifier, and the response information that are returned by the third-party server, a customer service identifier may be farther included. Therefore, when the Internet application server sends the public identifier and the response information to the terminal that corresponds to the Internet application identifier, the Internet application server may further send the customer service identifier to the terminal that corresponds to the Internet application identifier, to notify the user of a customer service person that is providing a service. This is not specifically limited in this embodiment.

In addition, the customer service identifier subordinate to the public identifier of the third-party server may be modified according to a requirement, and information corresponding to the customer service identifier is generally stored in the Internet application server. Therefore, the third-party server may modify, by means of Interaction with the Internet application server, the information that corresponds to the customer service identifier and that is stored in the Internet application server. A specific method includes: obtaining, by the third-party server, a customer service identifier processing request, where the customer service identifier processing request includes at least one customer service identifier and corresponding setting information, and the customer service identifier processing request is an information modification request for modifying stored information that corresponds to the customer service identifier; sending, by the third-party server, the customer service identifier processing request to the Internet application server; receiving, by the Internet application server, the customer service identifier processing request sent by the third-party server; and modifying, by the Internet application server according to the customer service identifier processing request, the stored information that corresponds to the customer service identifier.

The information corresponding to the customer service identifier may include a name of a customer service person, an avatar corresponding to the customer service person, or the like. The information corresponding to the customer service identifier is not specifically limited in this embodiment.

In addition, the third-party server may further obtain an operation, request, where the operation request includes at least one of: an addition request for adding a new customer service identifier, a modification request for modifying; a customer service identifier, a deletion request for deleting an existing customer service identifier, and an obtaining request for obtaining information that corresponds to a customer service identifier, and send the obtained operation request to an Internet server, so that the Internet server performs a corresponding operation according to the received operation request. This is not specifically limited in this embodiment.

For example, using the following operations to be performed on the customer service identifier as an example, correspondingly, content requested in an operation request may be:

(1) Add a Customer Service Identifier:

where the third-party server may add a customer service identifier in a manner of an http request: POST, for example, https://api-weixin.qq.com/customservice/kfaccount/add?access_token=ACCESS_TOKEN.

POST data is as follows:

```
{
    "kf_account" : "test1@test",
    "nickname" : "customer service person 1",
    "password" : "pswmd5",
}
```

(2) Modify a Customer Service Identifier:

where the third-party server may modify a customer service identifier in a manner of an http request: POST, for example, https://api.weixin.qq.com/customservice/kfaccount/update?access_token=ACCESS_TOKEN.

POST data is as follows:

```
{
    "kf_account" : "test1@test",
    "nickname" : "customer service person 1",
    "password" : "pswmd5",
}
```

(3) Delete a Customer Service Identifier:

where the third-party server may modify a customer service identifier in a manner of an Imp request: POST, for example, https://api.weixin.qq.com/customservice/kfaccount/del?access_token=ACCESS_TOKEN.

POST data is as follows:

```
{
  "kf_account" : "test1@test",
  "nickname" : "customer service person 1",
  "password" : "pswmd5",
}
```

(4) Set an Avatar Corresponding to a Customer Service Identifier:

where the third-party server may modify a customer service identifier in a manner of an http request: POST/FORM, for example, http://api.weixin.qq.com/customservice/kfaccount/uploadheading?access_taken=ACCESS_TOKEN&kf_account=KFACCOUNT.

POST data is as follows:

```
curl-F
  media=@test.jpg"https://
  /customerservice/kfaccount/uploadheadimg?access_token=
  ACCESS_TOKEN&kf_account=KFACCOUNT"
```

(5) Obtain Information that Corresponds to a Customer Service Identifier:

where the third-party server may modify a customer service identifier in a manner of an http request: GET, for example, https://api.weixin.qq.com/cgi-bin/customservice/getkflist?access_token=ACCESS_TOKEN.

POST data is as follows:

```
{
  "kf_list": [
    {
      "kf_account": "test1@test",
      "kf_nick": "ntest1",
      "kf_id": "1001"
      "kf_headimg": "http://mmbiz.qpic.cn/mmbiz/4whpV1VZl2iccsvYbHvnphkyGtnvjfUS8Ym0GSaLic0FD3vN0V8PILcibEGb2fPfEOmw/0"
    },
    {
      "kf_account": "test2@test",
      "kf_nick": "ntest2",
      "kf_id": "1002"
      "kf_headimg": "http://mmbiz.qpic.cn/mmbiz/4whpV1VZl2iccsvYbHvnphkyGtnvjfUS8Ym0GSaLic0FD3vN0V8PILcibEGb2fPfEOmw /0"
    },
    {
      "kf_account": "test3@test",
      "kf_nick": "ntest3",
      "kf_id": "1003"
      "kf_headimg": "http://mmbiz.qpic.cn/mmbiz/4whpV1VZl2iccsvYbHvnphkyGtnvjfUS8Ym0GSaLic0FD3vN0V8PILcibEGb2fPfEOmw /0"
    }
  ]
}
```

According to the method provided in this embodiment of the present disclosure, an Internet application server receives a request message sent by a terminal, and sends the request message to a third-party server; and the third-party server receives the request message, obtains response information according to the request message, and returns a public identifier, an Internet application identifier, and the response information. The Internet application server sends the received public identifier and response information to the terminal that corresponds to the Internet application identifier, so that by means of interaction between the third-party server and the terminal and the Internet application server, information reply based on an Internet application is implemented, and information exchange is highly flexible and an effect is desirable while a user requirement is satisfied.

An embodiment of the present disclosure provides a third-party server. The server is used to perform the function that is performed by the third-party server in the foregoing information exchange method provided in the embodiment corresponding to FIG. 2 or FIG. 4. A module in the present disclosure refers to software component or part of a computer program that contains one or more routines. One or more independently developed modules make up a program. An enterprise-level software application may contain several different modules, and each module, when executed by one or more processors, serves unique and separate business operations.

Figure 5:
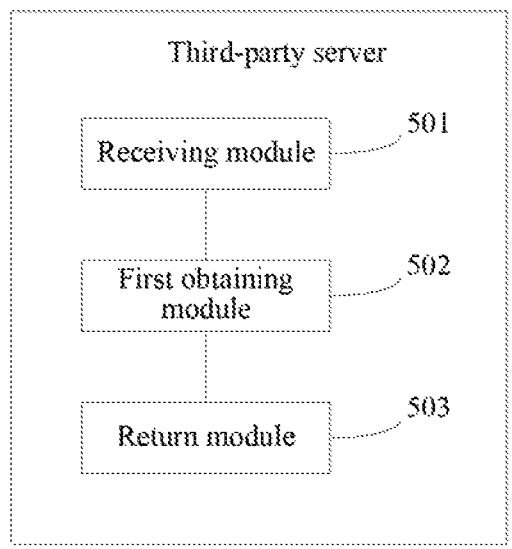
FIG. 5 is a schematic structural diagram of a third-party server according to another embodiment of the present disclosure.

Referring to FIG. 5, the third-party server includes: a receiving module 501, configured to receive a request message sent by an Internet application server, the request message carrying at least request information, a public identifier, and an Internet application identifier that is used by a terminal that sends the request message; a first obtaining module 502, configured to obtain response information according to the request information in the request message; and a return module 503, configured to return the public identifier, the Internet application identifier, and the response information to the Internet application server, so that the Internet application server sends the response information and the public identifier to the terminal that corresponds to the Internet application identifier, the response information being at least one of text information, picture information, audio information, and video information.

In an optional embodiment, the first obtaining module 502 is configured to: display an information reply interface according to the request information in the request message; and obtain the response information in the information reply interface; and the return module 503l is configured to send the response information, the public identifier, and the Internet application identifier to the Internet application server according to an information sending instruction if the information sending instruction is detected in the information reply interface.

In an optional embodiment, the first obtaining module 502 is configured to obtain, according to a predefined interface, the response information that corresponds to the request information in the request message; and the return module 503 is configured to send the response information, the public identifier, and the Internet application identifier to the Internet application server by using the predefined interface.

Figure 6:
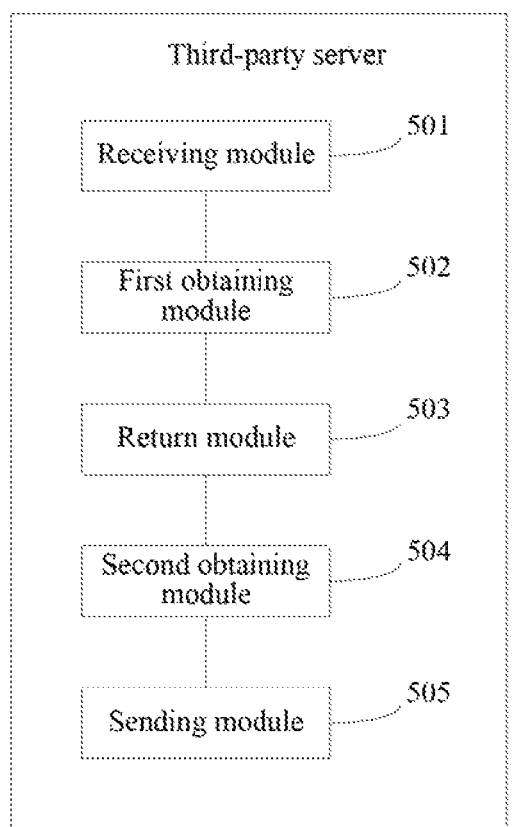
FIG. 6 is a schematic structural diagram of a third-party server according to another embodiment of the present disclosure.

In an optional embodiment, referring to FIG. 6, the server further includes: a second obtaining module 504, configured to obtain a customer service identifier processing request, where the customer service identifier processing request includes at least one customer service identifier and corresponding setting information; and a sending module 505, configured to send the customer service identifier processing request to the Internet application server, so that, the Internet application server modifies, according to the customer service identifier processing request, stored information that corresponds to the customer service identifier.

In an optional embodiment, the server further includes a module, configured to: obtain an operation request, where the operation request includes at least one of: an addition request for adding a customer service identifier, a modification request for modifying information that corresponds to a customer service identifier, a deletion request for deleting information that corresponds to a customer service identifier, and an obtaining request for obtaining information that corresponds to a customer service identifier, and send the operation request to the Internet application server, so that the Internet application server performs a corresponding operation according to the operation request.

The server provided in this embodiment of the present disclosure receives a request message sent by an Internet application server, and returns a public identifier, an Internet application identifier, and response information to the Internet application server according to the request message, so that the Internet application server sends the response information and the public identifier to a terminal that corresponds to the Internet application identifier, and by means of interaction between the third-party server and the terminal and the Internet application server, information reply based on an Internet application is implemented, and information exchange is highly flexible and an effect is desirable while a user requirement is satisfied.

Figure 7:
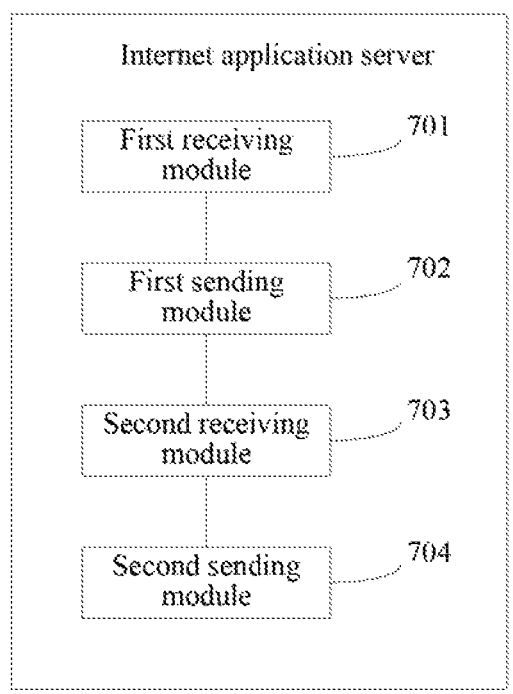
FIG. 7 is a schematic structural diagram of an Internet application server according to another embodiment of the present disclosure.

An embodiment of the present disclosure provides an Internet application server. The server is used to perform the function that is performed by the Internet application server in the foregoing information exchange method provided in the embodiment corresponding to FIG. 3 or FIG. 4. Referring to FIG. 7, the Internet application server includes: a first receiving module 701, configured to receive a request message sent by a terminal, the request message carrying at least request information, a public identifier, and an Internet application identifier that is used by the terminal; a first sending module 702, configured to, send the request message, to a third-party server that corresponds to the public identifier, so that the third-party server receives the request message, obtains response information according to the request information in the request message, and returns the public identifier, the Internet application identifier, and the response information, the response information being at least one of text information, picture information, audio information, and video information; a second receiving module 703, configured to receive the public identifier, the Internet application identifier, and the response information that are, returned by the third-party server; and a second sending module 704, configured to send the public identifier and the response information to the terminal that corresponds to the Internet application identifier.

Figure 8:
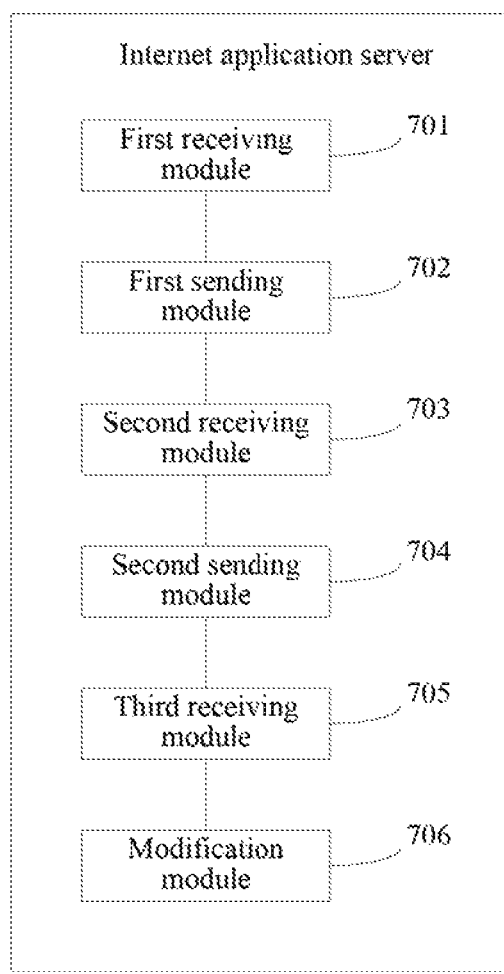
FIG. 8 is a schematic structural diagram of an Internet application server according to another embodiment of the present disclosure.

In an optional embodiment, referring to FIG. 8, the server further includes; a third receiving module 705, configured to receive a customer service identifier processing request sent by the third-party server, where the customer service identifier processing request includes at least one customer service identifier and corresponding setting information; and a modification module 706, configured to modify, according to the customer service identifier processing request, stored information that corresponds to the customer service identifier.

In an optional embodiment, the server further includes a module, configured to: receive an operation request sent by the third-party server, where the operation request includes at least one of: an addition request for adding a customer service identifier, a modification request for modifying a customer service identifier, a deletion request for deleting a customer service identifier, and an obtaining request for obtaining information that corresponds to a customer service identifier; and perform a corresponding operation according to the operation request.

The server provided in this embodiment of the present disclosure receives a request message sent by a terminal, and sends the request message to a third-party server; and the third-party server receives the request message, returns a public identifier, an Internet application identifier, and response information according to the request message, and sends the received public identifier and response information to the terminal that corresponds to the Internet application identifier, so that by means of interaction between the third-party server and the terminal and an Internet application server, information reply based on an Internet application is implemented, and information exchange is highly flexible and an effect is desirable while a user requirement is satisfied.

Figure 9:
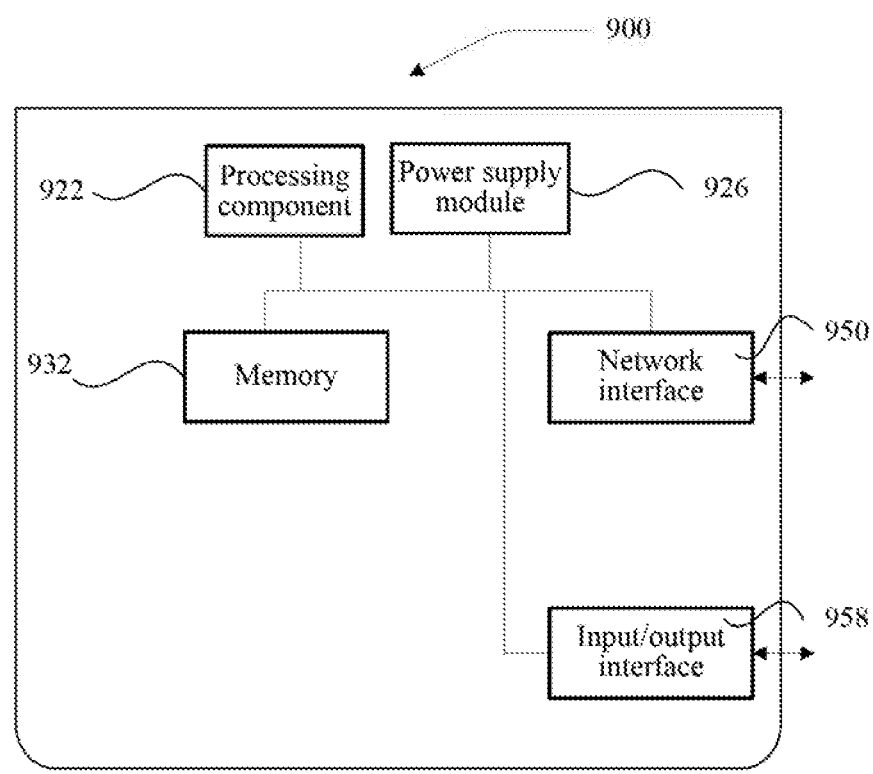
FIG. 9 is a schematic structural diagram of a server according to another embodiment of the present disclosure.

FIG. 9 is a block diagram of a server 900 shown according to an exemplary embodiment. Referring to FIG. 9, the server 900 includes a processing component 922, and further includes one or more processors, and a memory resource represented by a memory 932, configured to store an instruction that can be processed by the processing component 942, for example, an application program. The application program stored in the memory 932 may include one or more modules that each correspond to one set of instructions. In addition, the processing component 922 is configured to execute instructions, so as to perform the function that is performed by the third-party server in the information exchange method provided in the foregoing embodiment corresponding to FIG. 2 or FIG. 4.

The server 900 may further include one power supply module 926, configured to perform power supply management of the server 900, one wired or wireless network interface 950, configured to connect the server 900 to a network, and one input/output (I/O) interface 958. The server 900 may operate an operating system stored in the memory 932, for example, Windows Server™, Mac OS X™, Unix™, Linux™, or FreeBSD™.

The server 900 may further include one or more programs. The one or more programs are stored in the memory 932 and configured to be executed by the one or more processors. The one or more programs include instructions used for performing the following operations: receiving a request message sent by an Internet application server, the request message carrying at least request information, a public identifier, and an Internet application identifier that is used by a terminal that sends the request message; and obtaining response information according to the request information in the request message, and returning the public identifier, the Internet application identifier, and the response information to the Internet application server, so that the Internet application server sends the response information and the public identifier to the terminal that corresponds to the Internet application identifier, the response information being at least one of text information, picture information, audio information, and video information.

Optionally, the one or more programs further include instructions used for performing the following operations: displaying an information reply interface according to the request information in the request message; and obtaining the response information in the information reply interface.

The returning the public identifier, the Internet application identifier, and the response information to the Internet application server includes: sending the response information, the public identifier, and the Internet application identifier to the Internet application server according to an information sending instruction if the information sending instruction is detected in the information reply interface.

Optionally, the one or more programs further include instructions used for performing the following operations: obtaining, according to a predefined interface, the response information that corresponds to the request information in the request message. The returning the public identifier, the Internet application identifier, and the response information to the Internet application server includes: sending the response information, the public identifier, and the Internet application identifier to the Internet application server by using the predefined interface.

Optional, there is at leas customer service identifier subordinate to the public identifier, and the one or more programs further include instructions used for performing the following operations: determining a customer service identifier subordinate to the public identifier and used for sending information; and sending the response information, the public identifier, and the Internet application identifier to the Internet application server by using the predefined interface and according, to the determined customer service identifier.

Optionally, the Internet application server stores information that corresponds to all customer service identifiers subordinate to the public identifier, and the one or more programs further include instructions used for performing the following operations: obtaining a customer service identifier processing request, where the customer service identifier processing request includes at least one customer service identifier and corresponding setting information; and sending the customer service identifier processing request to the Internet application server, so that the Internet application server modifies, according to the customer service identifier processing request, stored information that corresponds to the customer service identifier.

Optionally, the one or more programs further include instructions used for performing the following operations: obtaining an operation request, where the operation request includes at least one of: an addition request for adding, a customer service identifier, a modification request for modifying a customer service identifier, a deletion request for deleting a customer service identifier, and an obtaining request for obtaining information that corresponds to a customer service identifier; and sending the operation request to the Internet application server, so that the Internet application server performs a corresponding operation according to the operation request.

The server provided in this embodiment of the present disclosure receives a request message sent by an Internet application server, and returns a public identifier, an Internet application identifier, and response information to the Internet application server according to the request message, so that the Internet application server sends the response information and the public identifier to a terminal that corresponds to the Internet application identifier, and by means of interaction between the third-party server and the terminal and the Internet application server, information reply based on an Internet application is implemented, and information exchange is highly flexible and an effect is desirable while a user requirement is satisfied.

Figure 10:
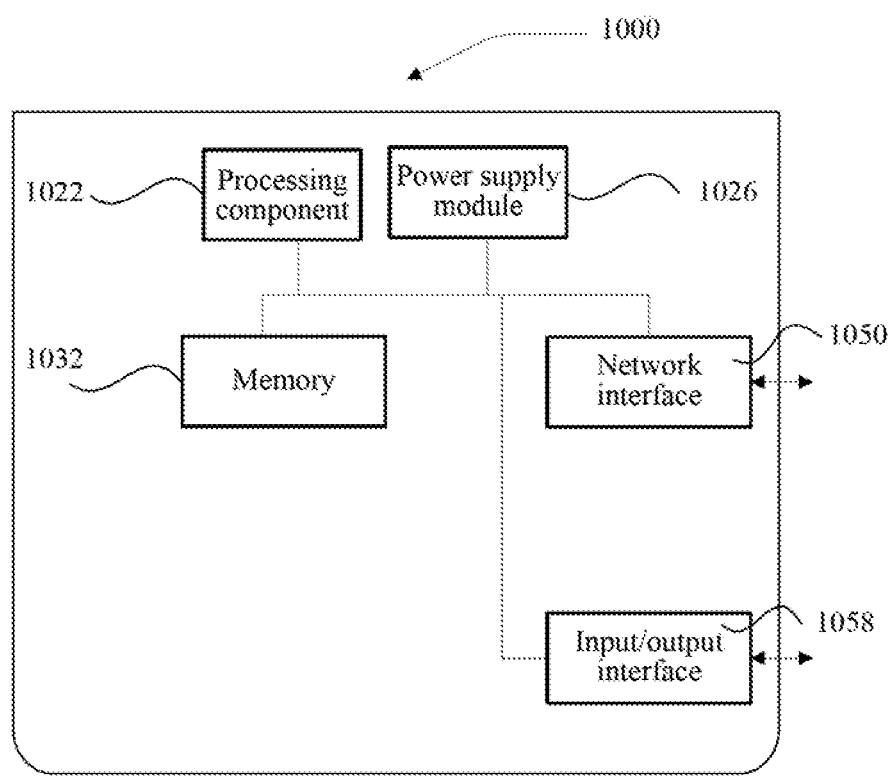
FIG. 10 is a schematic structural diagram of a server according to another embodiment of the present disclosure.

FIG. 10 is a block diagram of a server 1000 shown according to an exemplary embodiment. Referring to FIG. 10, the server 1000 includes a processing component 1022, and further includes one or more processors, and a memory resource represented by a memory 1032, configured to store an instruction that can be processed by the processing component 1022, for example, an application program. The application program stored in the memory 1032 may include one or more modules that each correspond to one set of instructions. In addition, the processing component 1022 is configured to execute instructions, so as to perform the function that is performed by the Internet application server in the information exchange method provided in the foregoing embodiment corresponding to FIG. 3 or FIG. 4.

The server 1000 may further include one power supply module 1026, configured to perform power supply management of the server 1000, one wired or wireless network interface 1050, configured to connect the server 1000 to a network, and one input/output (I/O) interface 1058. The server 1000 may operate an operating system stored in the memory 1032, for example, Windows Server™, Mac OS S™, Unix™, Linux™, or FreeBSD™.

The server 1000 may further include one or more programs. The one or more programs are stored in the memory 1032 and configured to be executed by the one or more processors. The one or more programs include instructions used for performing the following operations: receiving a request message sent by a terminal, the request message carrying at least request information, a public identifier, and an Internet application identifier that is used by the terminal; sending the request message to a third-party server that corresponds to the public identifier, so that the third-party server receives the request message, obtains response information according to the request information in the request message, and returns the public identifier, the Internet application identifier, and the response information, the response information being at least one of text information, picture information, audio information, and video information; and receiving the public identifier, the Internet application identifier, and the response information that are returned by the third-party server, and sending the public identifier and the response information to the terminal that corresponds to the Internet application identifier.

Optionally, the one or more programs further include instructions used for performing the following operations: receiving a customer service identifier processing request sent by the third-party server, where the customer service identifier processing request includes at least one customer service identifier and corresponding setting information; and modifying, according to the customer service identifier processing request, stored information that corresponds to the customer service identifier.

Optionally, the one or more programs further include instructions used for performing the following operations: receiving an operation request sent by the third-party server, where the operation request includes at least one of an addition request for adding a customer service identifier, a modification request for modifying a customer service identifier, a deletion request for deleting a customer service identifier, and an obtaining request for obtaining information that corresponds to a customer service identifier; and performing a corresponding operation according to the operation request.

The server provided in this embodiment of the present disclosure receives a request message sent by a terminal, and sends the request message to a third-party server; and the third-party server receives the request message, returns a pub is identifier, an Internet application identifier, and response information according to the request message, and sends the received public identifier and response information to the terminal that corresponds to the Internet application identifier, so that by means of interaction between the third-party server and the terminal and an Internet application server, information reply based on an Internet application is implemented, and information exchange is highly flexible and an effect is desirable while a user requirement is satisfied.

It should be noted that: when the servers provided in the foregoing embodiment exchange information, descriptions are only made by using an example of division of the foregoing functional modules. In an actual application, the foregoing functions may be allocated to different functional modules as required for implementation, that is, an internal structure of the server is divided into different functional modules, so as to complete all or some of the functions described above. In addition, the server and the information exchange method provided in the foregoing embodiments are based on a same conception. For a specific implementation process of the server, refer to the method embodiments, and details are not described herein again.

A person of ordinary skill in the art may understand that all or some of the steps of the embodiments may be implemented by hardware or a program instructing related hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An information exchange method, the method being used for an Internet application server that facilitates a third-party server and a terminal to exchange information, the terminal exchanging information with the Internet application server by using an Internet application identifier, the third-party server exchanging information with the Internet application server by using a public identifier, the public identifier and the Internet application identifier being account identifiers registered with the Internet application server, the method comprising:
   receiving a request message sent by the terminal, the request message carrying at least request information, the public identifier, and the Internet application identifier that is used by the terminal;
   sending the request message to the third-party server that corresponds to the public identifier by using a first Hypertext Transfer Protocol (HTTP) POST request, so that the third-party server receives the request message, obtains response information according to the request information in the request message, and returns the public identifier, the Internet application identifier, and the response information, wherein the response information is obtained from a first information reply interface corresponding to a selection of a quick reply option or a second information reply interface corresponding to a selection of a normal reply option, the response information from the first information reply interface containing just text information, and the response information from the second information reply interface comprising at least one of text information, picture information, audio information, and video information;
   receiving the public identifier, the Internet application identifier, and the response information that are returned by the third-party server, and sending the public identifier and the response information to the terminal that corresponds to the Internet application identifier;
   receiving a customer service identifier processing request sent by the third-party server, wherein the customer service identifier processing request is a second HTTP POST request and comprises at least one customer service identifier and corresponding account setting information; and
   modifying, according to the customer service identifier processing request, stored account information that corresponds to the customer service identifier,
   wherein:
   the Internet application server stores information that corresponds to all customer service identifiers subordinate to the public identifier, each customer service identifier being an account identifier registered with the Internet application server;
   the customer service identifiers are used by customer service persons to process multiple request messages received by the third-party server; and
   the response information returned by the third-party server to the Internet application server comprises a parameter indicating one of the customer service identifiers used to process the request message from the terminal.

2. The method according to claim 1, wherein the method further comprises:
   receiving an operation request sent by the third-party server, wherein the operation request comprises at least one of: an addition request for adding a customer service identifier, a modification request for modifying a customer service identifier, a deletion request for deleting a customer service identifier, and an obtaining request for obtaining information that corresponds to a customer service identifier; and
   performing a corresponding operation according to the operation request.

3. The method according to claim 1, wherein:
   the stored information that corresponds to the customer service identifier includes a password, a nick name and avatar information of a corresponding customer service person.

4. An information exchange method, the method being used for a third-party server, and being applied to a scenario in which the third-party server and a terminal exchange information by using an Internet application server, the terminal exchanging information with the Internet application server by using an Internet application identifier, the third-party server exchanging information with the Internet application server by using a public identifier, the public identifier and the Internet application identifier being identifiers registered with the Internet application server, and the method comprising:
- receiving a request message sent by the Internet application server, the request message being a first HTTP POST request carrying at least request information, the public identifier, and the Internet application identifier that is used by the terminal that sends the request message;
- obtaining response information according to the request information in the request message, including:
  - determining a customer service identifier subordinate to the public identifier and used for sending information, wherein the Internet application server stores information that corresponds to all customer service identifiers subordinate to the public identifier, each customer service identifier being an account identifier registered with the Internet application server; and the customer service identifiers are used by customer service persons to process multiple request messages received by the third-party server;
  - in response to a quick reply option being selected, displaying a first information reply interface according to the request information in the request message;
  - in response to a normal reply option being selected, displaying a second information reply interface according to the request information in the request message;
  - obtaining the response information in the first or second information reply interface, the response information from the first information reply interface containing just text information, and the response information from the second information reply interface comprising at least one of text information, picture information, audio information, and video information; and
  - adding, to the response information, a parameter indicating the determined customer service identifier used to process the request message from the terminal;
- returning the public identifier, the Internet application identifier, and the response information to the Internet application server, so that the Internet application server sends the response information and the public identifier to the terminal that corresponds to the Internet application identifier;
- obtaining a customer service identifier processing request, wherein the customer service identifier processing request comprises a customer service identifier and a corresponding account setting information; and
- sending the customer service identifier processing request to the Internet application server as a second HTTP POST request, so that the Internet application server modifies, according to the customer service identifier processing request, stored account information that corresponds to the customer service identifier.

5. The method according to claim 4, wherein
the returning the public identifier, the Internet application identifier, and the response information to the Internet application server comprises:
sending the response information, the public identifier, and the Internet application identifier to the Internet application server according to an information sending instruction if the information sending instruction is detected in the first or second information reply interface.

6. The method according to claim 4, wherein the obtaining response information according to the request information in the request message comprises:
- obtaining, according to a predefined interface, the response information that corresponds to the request information in the request message; and
- the returning the public identifier, the Internet application identifier, and the response information to the Internet application server comprises:
- sending the response information, the public identifier, and the Internet application identifier to the Internet application server by using the predefined interface.

7. The method according to claim 6, wherein the sending the response information, the public identifier, and the Internet application identifier to the Internet application server by using the predefined interface comprises:
sending the response information, the public identifier, and the Internet application identifier to the Internet application server by using the predefined interface and according to the determined customer service identifier.

8. The method according to claim 4, wherein the method further comprises:
- obtaining an operation request, wherein the operation request comprises at least one of: an addition request for adding a customer service identifier, a modification request for modifying a customer service identifier, a deletion request for deleting a customer service identifier, and an obtaining request for obtaining information that corresponds to a customer service identifier; and
- sending the operation request to the Internet application server, so that the Internet application server performs a corresponding operation according to the operation request.

9. The method according to claim 4, wherein determining the customer service identifier comprises:
selecting, according to a quantity of currently-to-be-processed request messages by each customer service identifier subordinate to the public identifier, a customer service identifier from all customer service identifiers that has a smallest quantity of currently-to-be-processed request messages.

10. The method according to claim 4, wherein obtaining the response information according to the request information in the request message further comprises:
- using the request message as a parameter;
- transmitting the parameter to a predefined application programming interface (API) function; and
- executing the API function to obtain the response information corresponding to the request message.

11. The method according to claim 4, wherein obtaining the response information according to the request information in the request message further comprises:
displaying the quick reply option and the normal reply option in an operation interface.

12. An Internet application server, the server comprising:
one or more processors; and
a memory;
the memory storing one or more programs, the one or more programs being configured to be performed by the one or more processors, and the one or more programs comprising instructions used to perform the following operations:
receiving a request message sent by a terminal, the request message carrying at least request information, a public identifier, and an Internet application identifier that is used by the terminal;

sending the request message to the third-party server that corresponds to the public identifier by using a first Hypertext Transfer Protocol (HTTP) POST request, so that the third-party server receives the request message, obtains response information according to the request information in the request message, and returns the public identifier, the Internet application identifier, and the response information, wherein the response information is obtained from a first information reply interface corresponding to a selection of a quick reply option or a second information reply interface corresponding to a selection of a normal reply option, the response information from the first information reply interface containing just text information, and the response information from the second information reply interface comprising at least one of text information, picture information, audio information, and video information;

receiving the public identifier, the Internet application identifier, and the response information that are returned by the third-party server, and sending the public identifier and the response information to the terminal that corresponds to the Internet application identifier;

receiving a customer service identifier processing request sent by the third-party server, wherein the customer service identifier processing request is a second HTTP POST request and comprises at least one customer service identifier and corresponding account setting information; and modifying, according to the customer service identifier processing request, stored account information that corresponds to the customer service identifier, wherein:
the Internet application server stores information that corresponds to all customer service identifiers subordinate to the public identifier, each customer service identifier being an account identifier registered with the Internet application server;

the customer service identifiers are used by customer service persons to process multiple request messages received by the third-party server; and the response information returned by the third-party server to the Internet application server comprises a parameter indicating one of the customer service identifiers used to process the request message from the terminal.

13. The server according to claim 12, wherein the one or more programs further comprise instructions used for performing the following operations:

receiving an operation request sent by the third-party server, wherein the operation request comprises at least one of: an addition request for adding a customer service identifier, a modification request for modifying a customer service identifier, a deletion request for deleting a customer service identifier, and an obtaining request for obtaining information that corresponds to a customer service identifier; and performing a corresponding operation according to the operation request.

14. A third-party server, the server comprising:
one or more processors; and
a memory;
the memory storing one or more programs, the one or more programs being configured to be performed by the one or more processors, and the one or more programs comprising instructions used to perform the following operations:

receiving a request message sent by an Internet application server, the request message being a first HTTP POST request carrying at least request information, a public identifier, and an Internet application identifier that is used by a terminal that sends the request message;

obtaining response information according to the request information in the request message, including:
determining a customer service identifier subordinate to the public identifier and used for sending information, wherein the Internet application server stores information that corresponds to all customer service identifiers subordinate to the public identifier, each customer service identifier being an account identifier registered with the Internet application server; and the customer service identifiers are used by customer service persons to process multiple request messages received by the third-party server;

in response to a quick reply option being selected, displaying a first information reply interface according to the request information in the request message;

in response to a normal reply option being selected, displaying a second information reply interface according to the request information in the request message;

obtaining the response information in the first or second information reply interface, the response information from the first information reply interface containing just text information, and the response information from the second information reply interface comprising at least one of text information, picture information, audio information, and video information; and adding, to the response information, a parameter indicating the determined customer service identifier used to process the request message from the terminal;

returning the public identifier, the Internet application identifier, and the response information to the Internet application server, so that the Internet application server sends the response information and the public identifier to the terminal that corresponds to the Internet application identifier;

obtaining a customer service identifier processing request, wherein the customer service identifier processing request comprises a customer service identifier and a corresponding account setting information; and sending the customer service identifier processing request to the Internet application server as a second HTTP POST request, so that the Internet application server modifies, according to the customer service identifier processing request, stored account information that corresponds to the customer service identifier.

15. The server according to claim 14, wherein
the returning the public identifier, the Internet application identifier, and the response information to the Internet application server comprises:
sending the response information, the public identifier, and the Internet application identifier to the Internet application server according to an information sending instruction if the information sending instruction is detected in the first or second information reply interface.

16. The server according to claim 14, wherein the one or more programs further comprise instructions used for performing the following operations:

obtaining, according to a predefined interface, the response information that corresponds to the request information in the request message; and the returning the public identifier, the Internet application identifier, and the response information to the Internet application server comprises:

sending the response information, the public identifier, and the Internet application identifier to the Internet application server by using the predefined interface.

17. The server according to claim 16, wherein the one or more programs further comprise instructions used for performing the following operations:

sending the response information, the public identifier, and the Internet application identifier to the Internet application server by using the predefined interface and according to the determined customer service identifier.

18. The server according to claim 14, wherein the one or more programs further comprise instructions used for performing the following operations:

obtaining an operation request, wherein the operation request comprises at least one of: an addition request for adding a customer service identifier, a modification request for modifying a customer service identifier, a deletion request for deleting a customer service identifier, and an obtaining request for obtaining information that corresponds to a customer service identifier; and sending the operation request to the Internet application server, so that the Internet application server performs a corresponding operation according to the operation request.

* * * * *